United States Patent [19]
Andrus et al.

[11] Patent Number: 5,093,147
[45] Date of Patent: Mar. 3, 1992

[54] PROVIDING INTELLIGIBLE MARKINGS

[75] Inventors: Paul G. Andrus, Powell; Thomas M. Dolash, Worthington, both of Ohio

[73] Assignee: Battelle Memorial Institute, Columbus, Ohio

[21] Appl. No.: 581,835

[22] Filed: Sep. 12, 1990

[51] Int. Cl.⁵ ............................................... B41M 3/14
[52] U.S. Cl. ........................................... 427/7; 427/64; 427/160
[58] Field of Search ............................. 427/160, 7, 64

[56] References Cited

U.S. PATENT DOCUMENTS

| | | | |
|---|---|---|---|
| 3,933,094 | 1/1976 | Murphy et al. | 283/74 |
| 4,230,344 | 10/1980 | Bell et al. | 283/6 |
| 4,540,595 | 9/1985 | Acitelli et al. | 427/7 |
| 4,605,846 | 8/1986 | Duret | 235/468 |
| 4,663,518 | 5/1987 | Borror et al. | 235/487 |

FOREIGN PATENT DOCUMENTS

| | | | |
|---|---|---|---|
| 1213193 | 11/1970 | United Kingdom | 427/7 |
| 1439173 | 6/1976 | United Kingdom | 427/7 |

Primary Examiner—Janyce Bell
Attorney, Agent, or Firm—Philip M. Dunson

[57] ABSTRACT

A method for providing intelligible markings that are virtually invisible to the unaided eye on the surface of an article, comprises: applying onto the surface, by a jet printing process, a marking medium comprising a compatible liquid or viscous substance containing an organic laser dye (typically IR-125 in a concentration of about 0.005 to 0.05 percent by weight of the medium) that is poorly absorptive of radiation in the visible range of about 400 to 700 nanometers, is highly absorptive of radiation in the near infrared range of at least about 750 nanometers in wavelength (typically about 750 to 900 nanometers), and fluoresces in response to radiation excitation in the said near infrared range to produce fluorescent radiation of wavelengths longer than the wavelength of the excitation (typically in the range of about 800 to 1100 nanometers). Other useful laser dyes may comprise DTTCI, DNTTCI, HDITCI, DDTTCI, IR-140, DDCI-4, or IR-132.

8 Claims, No Drawings

PROVIDING INTELLIGIBLE MARKINGS

The U.S. Postal Service has rights in this invention pursuant to Contract No. 104230-84-H-0003.

FIELD

This invention relates to methods for marking articles with indicia such as bar codes. It has to do more particularly with methods for providing intelligible markings that are substantially invisible to the unaided eye, by applying onto surfaces of articles virtually invisible inks that fluoresce in the near infrared region of the spectrum.

BACKGROUND

The marking of articles with bar codes for identification and sorting is well known. The conventional black on white bar code is useful only on areas of white or other light colored background on articles. Fluorescent bar codes can be applied anywhere on an article. Bar codes that are activated by ultraviolet light and fluoresce in the visible range have the disadvantage of interference from the background fluorescence of the article. Providing bar codes that fluoresce in the far red and near infrared substantially reduces the problem of background fluorescence interference.

A typical application of infrared fluorescing bar codes is for ZIP codes on postal material for sorting (Dolash, T. M., Andrus, P. G., and Stockum, L. A., "Novel Bar Coding System for Nonletter Mail", presented at Third Advanced Technology Conference sponsored by the U.S. Postal Service, Washington, D.C., May 3-5, 1988). Typically, the bar codes are printed with an ink-jet printer. The light source is a helium-neon laser and the detector includes a filter that blocks the activating light but passes the resulting fluorescent light from the bar codes. Typically, the ink is pigment-free and contains a fluorescent dye that absorbs the laser light at about 633 nanometers and produces a strong fluorescent signal at about 750 nanometers. The transparent blue bar codes do not obscure the underlying printed material. However, the reflectivity of the background can adversely affect the fluorescent signal and prevent accurate decoding.

A solution to this problem is provided in the copending U.S. patent application of Thomas M. Dolash, Paul G. Andrus, and Mark E. O'Loughlin, Ser. No. 392,171, filed Aug. 10, 1989, Background Compensating Bar Code Reader (assigned to Battelle Memorial Institute, the assignee of the present invention), now U.S. Pat. No. 4,983,817, issued Jan. 1, 1991. Separate detectors are provided to measure simultaneously the background reflectance and the fluorescence. The reflectance signal is used to compensate the fluorescent signal with suitable electronic circuitry to provide a background-compensated signal that can be used with conventional bar code readers to provide accurate decoding of the bar code.

Typically, the ink used in the above bar code reader contains an infrared fluorescing dye that absorbs in the red to allow use of the helium-neon laser at 633 nanometers. Typically the bar code is blue, enabling postal workers to see that a bar code has been printed, but it is kept light enough that it does not obscure names and addresses under it.

For some applications, such as in processing bank checks, involving document sorting equipment, the ink is formulated with a dye that fluoresces in the red and infrared and is also visible for human reading of the markings. U.S. Pat. No. 4,540,595 (Acitelli, et al) discloses a dye that fluoresces in the portion of the spectrum comprising wavelengths between 650 and 800 nanometers, in response to activating light in the range of 550 to 700 nanometers. Dyes that fluoresce in the range of 650 to 800 nanometers tend to absorb light in the visible spectrum and thus are useful for making human readable markings. The preferred human readable dye is a phenoxazine dye [3,7-bis(diethylamino) phenoxazonium nitrate] that in the preferred concentration of 0.09 to 0.12 percent has a visible light blue color. For use over light blue bank checks, the dye concentration is increased above the preferred range to 0.35 percent to make the markings more visible to the human eye.

Also in the prior art is another class of infrared fluorescent materials that can be activated in the infrared. These materials are inorganic compounds typified by the rare earths such as neodymium. U.S. Pat. No. 4,202,491 (Suzuki) discloses a data card wherein data are recorded with a powdery, inorganic infrared fluorescent material containing rare earths such as neodymium (Nd), ytterbium (Yb), and erbium (Er) that are activated in the infrared.

Fluorescent material containing Nd absorbs near 800 nanometers and can be activated with a gallium aluminum arsenide laser diode emitting at 800 nanometers. The maximum fluorescence is at 1050 nanometers. Fluorescent material containing Nd and Yb absorb near 800 nanometers and the fluorescence maximum is at 980 nanometers. Fluorescent material containing Nd, Yb, and Er absorb near 800 nanometers and the maximum fluorescence is at 1540 nanometers. Fluorescent material with only Yb and Er has a fluorescence maximum at 1540 nanometers but absorbs near 970 nanometers, necessitating a laser diode of gallium arsenide (silicon-doped) with an emission at 940 nanometers.

Typically, these inorganic materials are finely pulverized with a ball mill to an average grain diameter of 3 micrometers for use in printing inks. The inks dry to a white powder which is difficult to see on a white background surface but which would be visible on any colored background surface. Thus, to provide secrecy, the powdery material can be covered with a film that is opaque to wavelengths in the visible spectrum. Such a covering film also protects the powdery deposit from exfoliation in use. It is known that as the powders are made smaller in size, the fluorescent efficiency decreases and thicker films are required. Inks prepared from insoluble inorganic materials are generally not suitable for use in ink jet printers that are susceptible to clogging and those that produce thin films.

There are many applications in which it is desirable that the infrared fluorescing bar code be invisible to the unaided eye (i.e. no significant absorption in the visible spectrum from about 400 nanometers to about 700 nanometers). Such applications might include security needs or avoiding interference with the aesthetic properties of the package.

The present invention is based on use of infrared-fluorescing organic compounds such as laser dyes that are soluble in the ink vehicle. Specifically, the organic dyes of this invention can be activated in the infrared and fluoresce at longer wavelengths in the infrared. This class of materials is particularly useful for making inks for use in ink jet printers of bar codes. They can be invisible to the unaided eye over backgrounds of white or colored material, and when used in clear ink vehicles, the bar codes do not obscure the underlying background.

The present invention comprises a method for providing intelligible markings that are virtually invisible to the unaided eye on the surface of an article, comprising: applying, onto the surface, a marking medium comprising a compatible liquid or viscous substance containing an organic dye that is poorly absorptive of radiation in the visible range of about 400 to 700 nanometers, is highly absorptive of radiation in the near infrared range of at least about 750 nanometers in wavelength, and fluoresces in response to radiation excitation in the said near infrared range to produce fluorescent radiation of wavelengths longer than the wavelength of the excitation. Typically the dye is highly absorptive of radiation in the range of about 750 to 900 nanometers and the fluorescent radiation is produced principally in the range of about 800 to 1100 nanometers.

Typically the markings are applied by a jet printing process, and the dye comprises an organic laser dye such as IR-125, which typically is present in a concentration of about 0.005 to 0.05 percent by weight of the medium.

Other useful laser dyes may comprise DTTCI, DNTTCI, HDITCI, DDTTCI, IR-140, DDCI-4, or IR-132.

CARRYING OUT THE INVENTION

A primary feature of the invention is an invisible ink for marking articles with a bar code using an ink jet printer. The ink contains an organic infrared fluorescing dye that is soluble in the ink vehicle and that fluoresces at wavelengths above 800 nanometers and has low absorption in the visible region (400 to 700 nanometers). Typically, the dyes of this invention have high absorption between 750 and 850 nanometers and maximum infrared fluorescence in the range of 800 to 900 nanometers. The light source is a laser diode that scans the bar code and emits radiation in the range of high absorption by the dye. The detector can be a silicon photodiode with a filter to pass fluorescent light from the bar code and block reflected light from the laser diode. The detector has high sensitivity in the range where the dyes have maximum infrared fluorescence.

Suitable inks can be prepared from selected dyes that absorb radiation primarily in the near infrared region above 700 nanometers and fluoresce in the region above 800 nanometers. Certain laser dyes are particularly useful because of their high fluorescing efficiency; but other dyes that are less efficient fluorescers, and do not perform well as laser dyes, can be used also in the present invention.

Silicon photodiodes are responsive to radiation over the approximate range of 400 to 1100 nanometers with peak response at about 850 nanometers. Thus it is desirable to use dyes that fluoresce in the range of 800 to 900 nanometers. Organic dyes typically have their maximum absorption about 30 to 100 nanometers below the maximum fluorescence peak. Thus certain dyes that have absorption maxima in the range of 750 to 850 nanometers are useful in this invention. A laser diode that emits radiation close to the absorption maximum of the dye is preferred. A suitable laser diode is gallium aluminum arsenide (GaAlAs) which has radiation centered around 780 to 800 nanometers. Typically, the bandwidth is less than about 10 nanometers and the radiation center wavelength depends on the proportion of gallium relative to the other constituents in the laser diode. For example, one commercially-available GaAlAs laser diode having a wavelength of 780 nanometers has been used to activate fluorescence in dyes of this invention.

Other detectors can be used to operate at wavelengths longer than those that can be used with silicon detectors. For example, germanium detectors can operate at wavelengths longer than 1100 nanometers. Some laser dyes, such as IR-26, fluoresce at wavelengths longer than 1100 nanometers; and various laser diodes, such as some GaAlAs diodes, emit at wavelengths that are strongly absorbed by such laser dyes.

The table lists some dyes that have maximum absorption in the range of 750 to 850 nanometers selected from a compilation of properties of laser dyes. (*Lambdachrome Laser Dyes*, Ulrich Brackman, Lambda Physik Gmbh, D-3400 Gottingen, West Germany, 1986.) These dyes have maximum fluorescence in the range of 800 to 900 nanometers where silicon photodiodes have high response.

For invisible inks of this invention, the dye should have low absorption in the visible range of the spectrum (e.g. 400 to 700 nanometers). Over the visible range, absorption is highest at the longest wavelength (e.g. 700 nanometers) for the dyes of the table that have absorption maxima in the range of 760 to 830 nanometers.

TABLE

| Dye | Absorption maximum nm | Fluorescence maximum nm | Extinction Coefficient (E), liter mole$^{-1}$ cm$^{-1}$ | | |
|---|---|---|---|---|---|
| | | | at 700 nm | at 780 nm | at maximum |
| DTTCI | 760 | 815 | 6.8 | 16 | 21 |
| DNTTCI | 765 | ~850 | 6.8 | 17.5 | 22.5 |
| HDITCI | 780 | 824 | 7.2 | 23 | 23 |
| IR-125 | 795 | 838 | 4 | 14 | 17.3 |
| DDTTCI | 798 | 825 | 4.5 | 15 | 19.6 |
| IR-140 | 810 | 860 | 3.2 | 14 | 15 |
| DDCI-4 | 815 | 850 | 2.8 | 9 | 23.6 |
| IR-132 | 830 | 860 | 3 | 9.5 | 15.9 |

| Chemical Names and Structural Formulas of the Dyes | | |
|---|---|---|
| CAS Registry No. | | |
| 3071-70-3 | DTTCI | (3,3'-Diethylthiatricarbocyanine Iodide) |
| | DNTTCI | (3,3'-Diethyl-9,11-neopentylenethiatricarbocyanine Iodide) |
| 23178-67-8 | HDITCI | (1,1',3,3,3',3'-Hexamethyl-4,4',5,5'-dibenzo-2,2'-indotricarbocyanine Iodide) (Hexadibenzocyanine 3) |
| 3599-32-4 | IR-125 | 1H-Benz[e]indolium, 2-[7-[1,3-dihydro-1,1- |

TABLE-continued

| | | |
|---|---|---|
| | | dimethyl-3-(4-sulfobutyl)-2H-benz[e]indol-2-ylidene]-1,3,5-hepatrienyl]-1,1-dimethyl-3-(4-sulfobutyl-, sodium salt |
| | DDTTCI | (3,3'-Diethyl-4,4',5,5'-dibenzothiatricarbocyanine Iodide) (Hexadibenzocyanine 45) |
| 53655-17-7 | IR-140 | Benzothiazolium, 5-chloro-2[2-[3-[5-chloro-3-ethyl-2(3H)-benzothiazolylidene-ethylidene]-2-(diphenylamino)-1-cyclopenten-1-yl]ethyl]-3-ethyl-, perchlorate. |
| | DDCI-4 | (1,1'-Diethyl-4,4'-dicarbocyanine Iodide) |
| 62669-62-9 | IR-132 | Naphtho[2,3-d]thiazolium, 2-[2-[2-(diphenylamino)-3-[[3-(4-methoxy-4-oxobutyl)naptho[d]thiazol-2(3H)-ylidene-ethylidene]-1-cyclopenten-1-yl]ethenyl]3-(4-methoxy-oxobutyl)-, perchlorate |

DTTCI
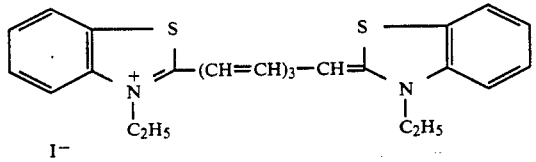

DNTTCI
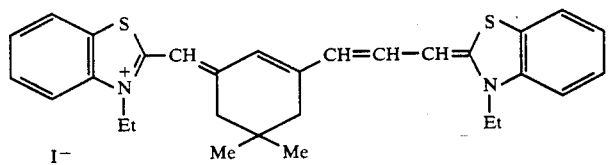

HDITCI
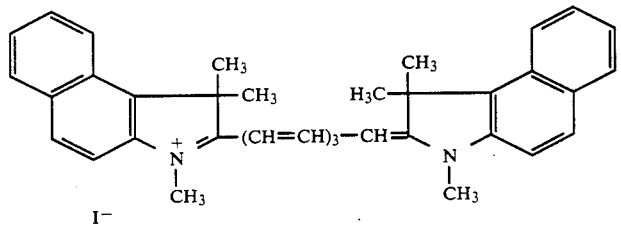

IR-125
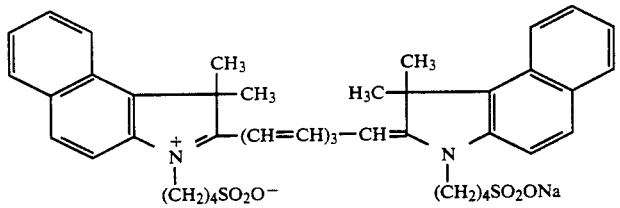

DDTTCI
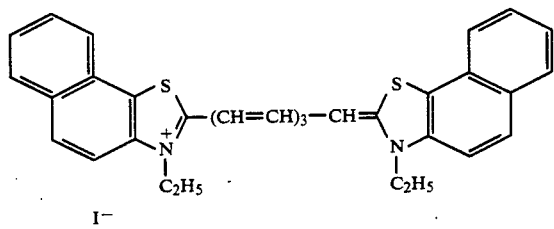

IR-140
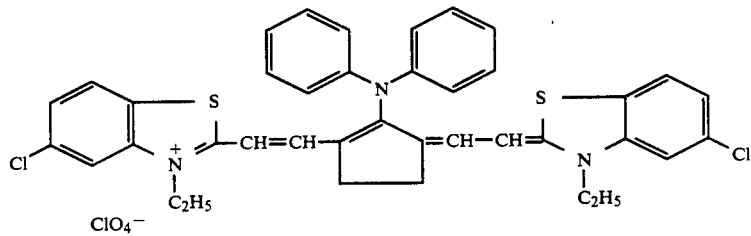

TABLE-continued

DDCI-4

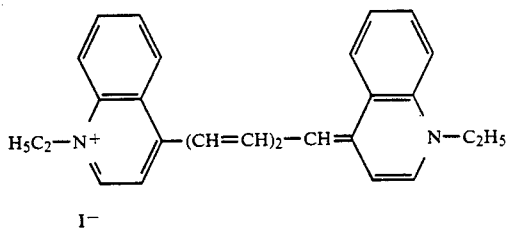

IR-132

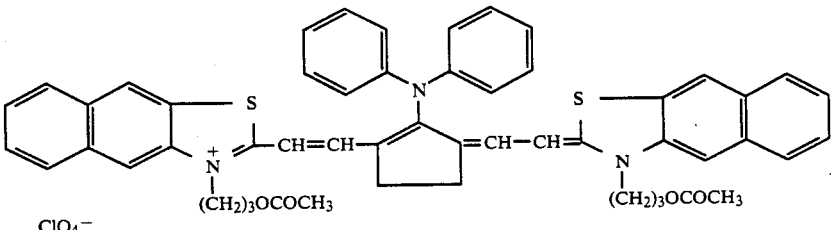

Dyes that are useful in this invention have low absorption at 700 nanometers (representative of the visible spectrum) and high absorption at the wavelength of the laser diode used (for example 780 nanometers). The relative absorption at different wavelengths can be compared based on the extinction coefficients, E, listed in the table.

Within the absorption spectra, the intensity is expressed as a molar decadic extinction coefficient, E. The amount of light absorbed depends on the extinction coefficient and the number of molecules in the light path. The latter amount depends on the concentration of the solution and the path length of the absorption cell. The amount of light that passes through a solution (transmittance) is given by Beer's law:

$$\log I/Io = -E \cdot c \cdot d \quad (1)$$

where Io is the intensity of light before it encounters the cell, I is the intensity of light emerging from the cell, c is the concentration in moles per liter, and d is the path length in centimeters.

As shown in the table, the value of E at a reference wavelength of 700 nanometers varies from 2.8 to 7.2 liters per mole-centimeter for the dyes listed. To minimize color in the visible spectrum, low concentrations of dye are used in the ink. However, the concentration of dye must be high enough to achieve high absorption at the wavelength of the laser diode to produce a strong fluorescent signal.

A figure of merit is the ratio of E at the wavelength of the laser diode to E at a wavelength of 700 nanometers (representative of the visible range). For example, the table lists the value of E at a wavelength of 780 nanometers for each dye. For all of the dyes listed, the ratio of E at 780 nanometers to E at 700 nanometers is at least 2.3, and for most of them it is at least 3. Because of the logarithmic relationship in Beer's law (Equation 1), a factor of 3 represents a 1000-fold difference in absorption. Higher ratios can be obtained by selecting a laser diode that emits radiation close to the maximum absorption of the particular dye as listed in the table.

In general, dyes with a maximum fluorescence at a wavelength displaced farther from the wavelength of the laser diode are desirable to provide better separation of reflected activating light and fluorescent light with filters. The important criterion for accurately reading bar codes is the ratio of the fluorescent signal from a bar to the background signal from a space between bars. The latter results predominantly from leakage of reflected light from the laser diode due to inefficient separation of wavelengths of light by the filter, since the background materials on which the bar codes are printed have negligible fluorescent emission in the infrared range of the dyes of this invention.

Fluorescent efficiency of the dye is also a factor in addition to the desirable absorption characteristics at the wavelengths of interest. Efficiency often depends on the purity of the dye and on the host material in which the dye is dispersed, and many dyes show little fluorescence unless dispersed in a suitable host material. Since these factors can vary depending on the dye manufacturer and the specific ink vehicle in which the dye is used, experimental verification of the suitability of a particular dye is needed.

A preferred dye in the practice of this invention is IR-125 which has low absorption in the visible range and high absorption for use with a gallium aluminum arsenide laser diode emitting at 780 nanometers.

EXAMPLE 1

A small quantity of solvent-based ink was formulated with the following composition:

| | |
|---|---|
| Resin | 1.2 grams |
| Ethanol | 9.6 grams |
| Acetone | 1.2 grams |
| IR-125 dye | 0.0006 gram |

The ink contained about 10 percent resin to serve as a host for the dye which was present at a concentration of about 0.005 percent (or 0.05 percent based on resin content). The resin used was Staybelite Ester 10 (Hercules Chemical Co.). The solution has a light greenish color but is virtually invisible on white paper in the thin layers typical of bar codes produced by ink-jet printers. The dye used is a laser dye designated IR-125 (CAS Registry number 3599-32-4) originally developed as a dye for pulsed laser operation.

According to the manufacturer's data on the dye listed in the table, its maximum absorption in DMSO (dimethylsulfoxide) occurs at a wavelength of 795 nanometers and its maximum fluorescence in chloroform occurs at a wavelength of 838 nanometers. Slightly different values might be expected depending on the composition of the ink. A spectral absorption curve for this dye in the above ink confirmed its low absorption in the visible range of 400 nanometers to 700 nanometers and peak absorption at about 785 nanometers. A fluorescence spectrum for the dye in the above ink on white paper was obtained by irradiation at 780 nanometers. The fluorescence maximum was at 865 nanometers (compared to 838 nanometers reported in the table for the IR-125 dye in chloroform).

Using the above ink, bar codes were written on laser-printer paper with an HP 7470A (Hewlett Packard) plotter using a 0.5 millimeter diameter capillary pen. The pen deposits a very thin layer of ink which quickly dries.

Fluorescent response of the bar codes was determined with an Infrared Fluorometer with a filter (Hoya, IR-87). The light source was a laser diode emitting at 780 nanometers. The background reading on plain white paper was 3.5 millivolts (the filter used allowed a small amount of laser light to reach the photodetector). The fluorescence reading when the beam was incident on a bar of the bar code was between 10 and 15 millivolts. The bar code was essentially invisible on white paper or other colored papers.

The fluorescent signal strength can be increased by increasing the concentration of dye in the ink. With a ten-fold increase in dye concentration, the signal was increased five-fold, but the bar code became barely visible on white paper.

The IR-125 dye was chosen for this ink because it is an efficient infrared fluorescer and it is a poor absorber of visible light. Other possible laser dyes having desirable properties are listed in the table.

For some applications, water as a solvent might be preferred over the organic solvents used in Example 1.

EXAMPLE 2

A water-based ink with IR-125 dye was prepared using polyvinyl alcohol (PVA) as the resin as follows:

| | |
|---|---|
| PVA | 75 grams |
| Water | 525 milliliters |
| Formaldehyde, 37% | 0.5 milliliter |

-continued

| | |
|---|---|
| IR-125 dye | 0.06 gram |

The PVA used was Elvanol PVA 51-05 (General Electric Co.) which is no longer available commercially. However, other PVA's of the type that are soluble in cold water are available and can be used. The ink was applied in a thin layer on paper and allowed to dry. When irradiated with a laser diode at 780 nanometers, a substantial fluorescent signal at wavelengths above 800 nanometers was observed.

While the forms of the invention herein disclosed constitute presently preferred embodiments, many others are possible. It is not intended herein to mention all of the possible equivalent forms or ramifications of the invention. It is to be understood that the terms used herein are merely descriptive, rather than limiting, and that various changes may be made without departing from the spirit or scope of the invention.

We claim:

1. A method for providing intelligible markings that are virtually invisible to the unaided eye on the surface of an article, comprising: applying, onto the surface, a marking medium comprising a compatible liquid or viscous substance containing an organic dye that is poorly absorptive of radiation in the visible range of about 400 to 700 nanometers, is highly absorptive of radiation in the near infrared range of at least about 750 nanometers in wavelength, and fluoresces in response to radiation excitation in the said near infrared range to produce fluorescent radiation of wavelengths longer than the wavelength of the excitation.

2. A method as in claim 1, wherein the dye is highly absorptive of radiation in the range of about 750 to 900 nanometers.

3. A method as in claim 2, wherein the fluorescent radiation is produced principally in the range of about 800 to 1100 nanometers.

4. A method as in claim 1, wherein the markings are applied by a jet printing process.

5. A method as in claim 1, wherein the dye comprises an organic laser dye.

6. A method as in claim 5, wherein the laser dye comprises IR-125.

7. A method as in claim 6, wherein the dye is present in a concentration of about 0.005 to 0.05 percent by weight of the medium.

8. A method as in claim 3, wherein the laser dye comprises DTTCI, DNTTCI, HDITCI, IR-125, DDTTCI, IR-140, DDCI-4, or IR-132.

* * * * *